(12) United States Patent
Kande et al.

(10) Patent No.: US 12,276,970 B2
(45) Date of Patent: Apr. 15, 2025

(54) SYSTEMS AND METHODS FOR CONTROLLER DIAGNOSTICS AND SERVICE

(71) Applicant: ABB Schweiz AG, Baden (CH)

(72) Inventors: Mallikarjun Kande, Solon, OH (US); David Mielnik, Painesville, OH (US)

(73) Assignee: ABB Schweiz AG, Baden (CH)

( * ) Notice: Subject to any disclaimer, the term of this patent is extended or adjusted under 35 U.S.C. 154(b) by 403 days.

(21) Appl. No.: 17/436,037

(22) PCT Filed: Mar. 2, 2020

(86) PCT No.: PCT/US2020/020678
§ 371 (c)(1),
(2) Date: Sep. 2, 2021

(87) PCT Pub. No.: WO2020/180803
PCT Pub. Date: Sep. 10, 2020

(65) Prior Publication Data
US 2022/0171368 A1     Jun. 2, 2022

Related U.S. Application Data

(60) Provisional application No. 62/813,013, filed on Mar. 2, 2019.

(51) Int. Cl.
*G05B 19/418*     (2006.01)
*H04L 67/025*     (2022.01)

(52) U.S. Cl.
CPC ........ *G05B 19/4184* (2013.01); *H04L 67/025* (2013.01); *G05B 2219/24048* (2013.01)

(58) Field of Classification Search
CPC ...... G05B 19/4184; G05B 2219/25092; G05B 2219/33284; H04L 67/025; H04L 69/40
See application file for complete search history.

(56) References Cited

U.S. PATENT DOCUMENTS 6,014,612 A * 1/2000 Larson .................... G06F 11/22
                                                                                        700/11
7,130,701 B1 10/2006 Wischinski
(Continued)

OTHER PUBLICATIONS

Extended European Search Report for European Application No. 20766880.7 dated Oct. 25, 2022, 11 pages.
(Continued)

*Primary Examiner* — Michael W Choi
(74) *Attorney, Agent, or Firm* — McCarter & English, LLP; Michael M. Gnibus

(57) ABSTRACT

According to one aspect of this disclosure, a distributed control system may include a diagnostic engine, a plurality of computing resources generating diagnostic parameters for transmission to the diagnostic engine, a first communication link operatively coupling the plurality of computing resources to one another, a second communication link operatively coupling the plurality of computing resources to the diagnostic engine, and a remote connection operatively coupling the diagnostic engine to a remote computing resource. The diagnostic parameters may indicate one or more conditions for at least one of the plurality of computing resources. The diagnostic engine locally observes the diagnostic parameters of the plurality of computing resources via the first communication link, and the remote computing resource initiates operation of the diagnostic engine via the remote connection and evaluates the diagnostic parameters remotely.

20 Claims, 6 Drawing Sheets

(56) References Cited

U.S. PATENT DOCUMENTS

| | | | |
|---|---|---|---|
| 2005/0197806 A1* | 9/2005 | Eryurek | G05B 23/0221 |
| | | | 702/188 |
| 2007/0010898 A1* | 1/2007 | Hosek | G05B 19/4148 |
| | | | 700/2 |
| 2007/0078629 A1 | 4/2007 | Gollhardt et al. | |
| 2009/0132710 A1 | 5/2009 | Pelley | |
| 2009/0204458 A1 | 8/2009 | Wiese et al. | |
| 2010/0223028 A1 | 9/2010 | Qiao | |
| 2011/0257766 A1 | 10/2011 | Sundaram et al. | |
| 2012/0035749 A1 | 2/2012 | Schleiss et al. | |
| 2017/0102694 A1* | 4/2017 | Enver | G06Q 10/06395 |
| 2019/0204458 A1 | 7/2019 | Blahuta et al. | |

OTHER PUBLICATIONS

International Search Report and Written Opinion for International Patent Application No. PCT/US2020/020678, dated Jun. 24, 2020, 2 pages.
CN Search Report 1st Office Action for Patent Application No. 202080028600.2, dated Mar. 19, 2024, 2 pages.
CN Written Opinion 1st Office Action for Patent Application No. 202080028600.2, dated Mar. 20, 2024, 18 pages.

\* cited by examiner

| | |
|---|---|
| 17952 | ANA4XRLOCAL |
| 13185 | DIGXRLOCAL |
| 5501892 | ETHBYTESRCV |
| 29878864 | ETHBYTESENT |
| 41693 | HNARBCNT |
| 1 | HNCONTROLLER |
| 0 | HNCRCERR_A |
| 0 | HNCRCERR_B |
| 1581712 | HNDATA_A |
| 1487704 | HNDATA_B |
| 0 | HNDATAERR_A |
| 0 | HNDATAERR_B |
| 0 | HNERR_A |
| 0 | HNERR_B |
| 1984121344 | HNIDLE_A |

| | |
|---|---|
| 0 | HNLOOPBACKERR_A |
| 0 | HNLOOPBACKERR_B |
| 932794560 | HNNULLARBCNT |
| 0 | HNREPLY_A |
| 0 | HNREPLY_B |
| 0 | HNRXOVER |
| 0 | HNSKEWCNT_A |
| 0 | HNSKEWCNT_B |
| 2 | HNSPEED |
| 0 | HNINSTALLCNT |
| 21970 | HNTXCNT |
| 1460 | MSXRLOCAL |
| 0 | PINGSANSWERED |
| 105262 | XRSENTCTR |
| 1866356992 | HNIDLE_B |

FIG. 8

SYSTEMS AND METHODS FOR CONTROLLER DIAGNOSTICS AND SERVICE

CROSS-REFERENCE TO RELATED APPLICATION

This application is a U.S. National Stage Application of International Patent Application No. PCT/US2020/020678, filed Mar. 2, 2020, which claims priority to U.S. Provisional Patent Application No. 62/813,013, filed Mar. 2, 2019, each of which is hereby incorporated by reference herein in their entirety.

TECHNICAL FIELD

The present disclosure relates to interfacing between computing resources, and more particularly, to diagnosing and servicing controllers.

BACKGROUND

Computing resources frequently must communicate with one another. A controller enables the communication and connection of computing resources. Often times, controllers are called upon to work with many types of computing hardware and are critical to broader system functionality. Particular parameters are used to observe the ongoing operation of controllers. In view of the system-critical character of many controllers, increased accuracy and efficiency in diagnosing and servicing controllers represents an improvement in the art.

Conventionally, controller diagnostics are performed by experts during manual inspection of a controller utilizing arbitrary measurements. This conventional workflow requires a service engineer to visit a controller at the deployment site thereof (e.g., an operational manufacturing plant or other facility) and gather data for diagnostic analysis. Manual inspection is time consuming, expensive, and relatively unproductive. Therefore, systems and/or methods for diagnosing and servicing a controller remotely represent still further improvement in the art.

The description provided in the background section should not be assumed to be prior art merely because it is mentioned in or associated with the background section. The background section may include information that describes one or more aspects of the subject technology.

SUMMARY

According to one aspect of this disclosure, a distributed control system may comprise a diagnostic engine, a plurality of computing resources generating diagnostic parameters for transmission to the diagnostic engine, wherein the diagnostic parameters indicate one or more conditions for at least one of the plurality of computing resources, a first communication link operatively coupling the plurality of computing resources to one another, a second communication link operatively coupling the plurality of computing resources to the diagnostic engine, and a remote connection operatively coupling the diagnostic engine to a remote computing resource, wherein the diagnostic engine locally observes the diagnostic parameters of the plurality of computing resources via the first communication link, and wherein the remote computing resource initiates an operation of the diagnostic engine via the remote connection and evaluates the diagnostic parameters remotely.

In some embodiments, the plurality of computing resources may comprise one or more controllers and a plurality of other computing components.

In some embodiments, the one or more controllers and the plurality of other computing components may be configurable for operation of an industrial plant, and diagnostic logic developed by the remote computing resource may determine operating conditions of the industrial plant.

In some embodiments, the diagnostic logic may developed from at least some of the diagnostic parameters.

In some embodiments, the diagnostic logic may be customized for the one or more controllers and the plurality of computing components.

In some embodiments, the plurality of other computing components may comprise one or more communications modules and one or more auxiliary modules.

In some embodiments, the diagnostic parameters may comprise one or more controller parameters.

In some embodiments, the diagnostic parameters may further comprise one or more other computing component parameters.

In some embodiments, the one or more controllers may be distributed.

In some embodiments, the second communication link may use an open standard communication protocol for transmitting diagnostic logic, diagnostic data, and/or service data.

In some embodiments, the diagnostic engine may comprise at least one hardware computing component and at least one software computing module.

According to another aspect of the present disclosure, a remotely diagnosable distributed control system may comprise a network of distributed controllers, a diagnostic engine communicatively coupled to the network of distributed controllers to monitor a plurality of diagnostic parameters, and a communication link allowing remote access to the diagnostic engine from a remote support platform, such that the remote support platform can obtain the plurality of diagnostic parameters and can initiate support services.

In some embodiments, the support services may comprise a diagnostic protocol, a hardware service order, a software service order, and/or a diagnostic data collection.

In some embodiments, the remote support platform may comprise a plurality of remote computing resources.

In some embodiments, the plurality of remote computing resources may comprise a mobile device, an enterprise platform, and a support provider.

In some embodiments, the remote support platform may direct the diagnostic engine to execute a diagnostic protocol, wherein the diagnostic protocol is customizable based on a plant configuration associated with the network of distributed controllers.

In some embodiments, the diagnostic protocol may direct the diagnostic engine to generate one or more controller parameters from the distributed controllers.

In some embodiments, the diagnostic protocol may direct the diagnostic engine to observe a parameter from a computing component communicatively coupled to at least one controller of the network of distributed controllers.

According to yet another aspect of the present disclosure, a method of remotely diagnosing a system may comprise remotely accessing a diagnostic engine via a remote support platform, developing at least one diagnostic protocol based on a plurality of diagnostic parameters comprising at least one controller parameter and at least one component parameter, triggering the diagnostic engine to execute the at least one diagnostic protocol, and remotely determining a service need based on one or more results from the executed diagnostic protocol.

In some embodiments, the method may further comprise receiving the plurality of diagnostic parameters from the diagnostic engine.

In some embodiments, the diagnostic protocol may be one of module diagnostics, performance diagnostics, and configuration diagnostics.

In some embodiments, the method may further comprise remotely initiating a service based on the diagnostic protocol and a customer specification received via the remote support platform.

According to still another aspect of the present disclosure, a system for remotely supporting a plant may comprise a communications link to a diagnostic engine disposed within the plant, the diagnostic engine forming part of a plant network operably coupling a plurality of controllers with a plurality of computing components according to a distributed control topology, and a remote support platform for directing the diagnostic engine via the communications link to execute a diagnostic protocol.

In some embodiments, the diagnostic protocol may query at least one controller parameter unique to the distributed control topology of the plant network.

In some embodiments, the remote support platform may receive diagnostic data from the diagnostic engine via the communications link for remote expert evaluation.

In some embodiments, the remote support platform may be accessible from a plurality of locations.

In some embodiments, the remote support platform may be configured to perform any of the methods disclosed herein.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 8 is a table listing a number of parameters indicative of controller-generated diagnostic data.

Figure 1:
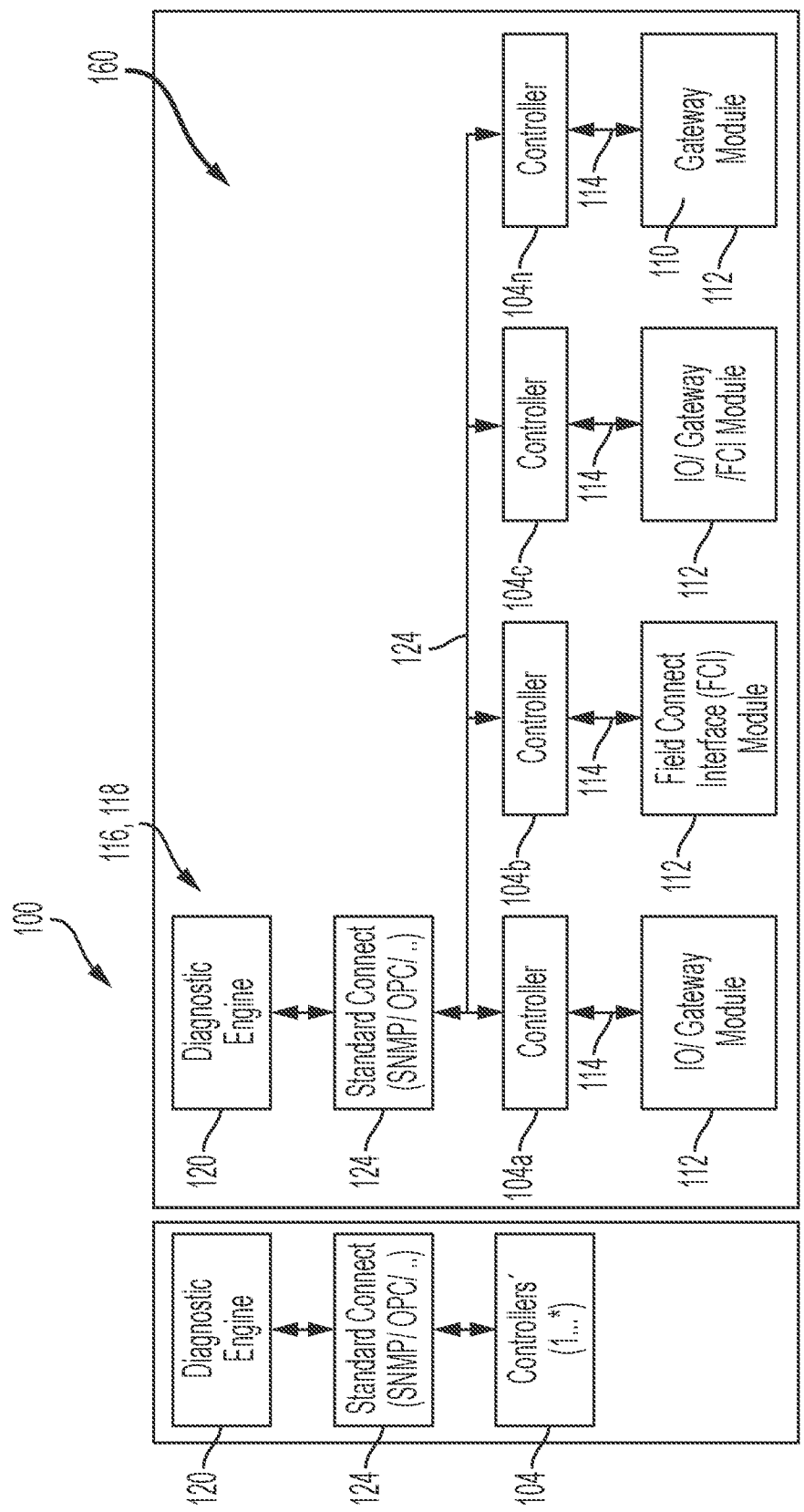
FIG. 1 is a simplified block diagram illustrating an example of a system and a method for controller or plant diagnostics and service.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Generally, the present disclosure details for a distributed control or whole-plant diagnostics and service system 100 (see FIGS. 1-8) using standardized interoperable connectivity solutions and diagnostic parameters 102 of certain proprietary controllers and computing components. Proprietary controller parameters 102a, which may include, for example, one or more HN (Harmony Network™) parameters specific to controllers supplied by ABB™ (see FIGS. 2 and 8), of one or more controllers 104 may be collected by a diagnostic engine 120. Particular parameters may be specific to portions of a system or plant distributed control network 160. The distributed control or whole-plant diagnostics and service system contemplates the operational plant 162, (e.g., a manufacturing facility) having the one or more controllers 104 arranged as a distributed control system to direct the, often complex, functions and equipment performing the business goal of the plant. An example of the distributed control system/plant network 160 includes a partitioned network having relatively independent subnets including, for example, HN800 (an example Harmony Network™, as noted hereinabove), PN800 (Plant Network), and/or other representative names in a hierarchically separated network for unique functions within a distributed network topology (e.g., a DCS (Distributed Control System)), such as that frequently associated with an ABB Symphony Plus™ controller. Also, the proprietary controller parameters 102a may be used alone or in combination with one or more component parameters indicating conditions of one or more computing components within the network to monitor the health and functionality of the proprietary controller(s) 104, the distributed control system/plant network 160, and a plant (or facility) 162. Still further, the diagnosis and service may be performed locally and/or remotely. Local and/or remote diagnosis may result in initiation of service and/or maintenance on demand, according to a predetermined schedule, and/or automatically as a response to one or more pieces of diagnostic data 106 (see FIGS. 4 and 7) collected by the system and/or method 100.

Referring now to FIG. 1, the system 100 detects one or more controllers 104a, 104b, 104n and one or more computing resources 112 such as, for example, one or more communication modules 108, one or more auxiliary modules 110 (e.g., I/O modules), and/or other suitable computing modules/resources. The system further detects hardware components associated with these one or more computing resources 112. The numerous computing resources/component(s) 112 are communicatively connected by the controller(s) 104 to the broader distributed control system/plant network 160 and the diagnostic system 100. Faults in a module communication link/bus 114 between the computing resources 112 and the one or more controllers 104 may result in generation of particular ones of the one or more diagnostic parameters 102. The diagnostic parameters 102 may be generated by the controller(s) 104 and/or by the one or more computing components 112 responsive to the module communication link/bus 114 (or a fault therein) identified by one of the controller(s) 104 associated with the particular computing component 112. Following generation, selected ones of the diagnostic parameters 102 are supplied to the diagnostic engine 120 to generate diagnostic data 106 according to a diagnostic process 116. In example embodiments, the diagnostic engine 120 may be disposed within and executed by one or more of the controller(s) 104 forming the distributed control system or the diagnostic engine 120 may be a separate computing resource with differing hardware and software customized for communication with a remote support platform 140 (see FIG. 7).

The inspection and diagnosis operation 116 may be desirable for system troubleshooting and servicing and maintenance of the controller(s) 104, other module(s)/component(s) 112, and/or the communication link(s) 114. The communications link(s) 114 facilitate communication between the distributed controller(s) 104 and the computing component(s) 112 directed by those controller(s) 104 while an open communications link 124 establishes the system or plant distributed control network 160 and communications between the controller(s) 104 forming the distributed control network 160. The inspection and diagnosis operation 116 may be initiated remotely and triggered by the diagnostic engine 120, but the operation 116 is performed at the controller level, whereby the controller(s) 104 provide a summary of all the computing resources/components 112 with which each of the controller(s) 104 is presently interfaced. The inspection and diagnosis operation 116 may further supply status and/or diagnostic information for each of the computing resources 112 interfacing with the controller 104. The diagnosis process 116 may carry out one or more diagnostic protocols 118 that gathers a number of the controller parameters 102a from the controller(s) 104 and a number of component parameter(s) 102b from the one or more computing components 112. The diagnosis operation 116 may initiate execution of an example diagnostic protocol and gather a subset of the controller parameter(s) and the component parameter(s) 102(b) for transmission to a service technician or center as well as returning certain of the subset of parameters to the controller(s) 104 and the computing components 112. In an example, the diagnostic protocol 118 collects the diagnostic parameters 102 for logging of faults, training machine learning algorithms associated with operation of the planet (perhaps executed by the one or more controllers 104), informing service orders and service providers, and informing maintenance decisions. In an additional example, the diagnostic protocol 118 transmits the diagnostic parameters 102 to the computing components 112 or controllers 104 to provide information regarding faults in particular components, communications links, network components, or controllers for the purpose of re-routing particular functions, shutting down plant functions that would not operate effectively or safely without access to faulty components, the shutdown of one or more subnets of the network, shifting from primary networks to redundant networks, or the total shutdown of the plant/facility 162.

In another embodiment, a service engineer may implement the diagnostic process 116 by initiating generation and acquisition of the proprietary controller parameters 102a locally by way of a diagnostic port and/or another suitable local I/O interface with the controller(s) 104. The acquired proprietary controller parameters 102a may be transmitted to another service provider (e.g., the manufacturer of the controller) for expert diagnostics, failure identification, and report generation. In another example, the diagnostic process 116 may execute an example one of the diagnostic protocols 118 that acquires the diagnostic parameters 102, including the component parameters 102b, via a diagnostic port and/or another suitable local I/O interface disposed one of the controller(s) 104 or in another one of the computing components 112 (e.g., a communications modules or network module).

Figure 2:
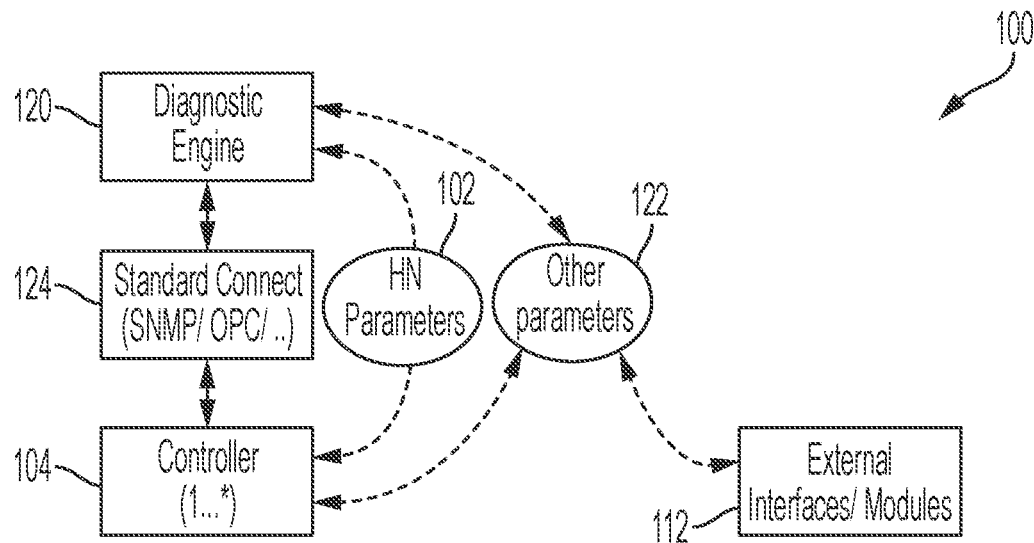
FIG. 2 is a simplified flowchart illustrating an example of a diagnostic system and method utilizing proprietary controller generated diagnostic data (or parameters) alongside component parameters generated by one or more computing components.

Standard communication protocols such as SNMP (Simple Network Management Protocol), OPC (Open Platform Communications), and/or other suitable communications protocols are used to transmit information (over a wired and/or wireless communications network), including select of the controller parameters 102, from the controller(s) 104 to the diagnostic engine 120 and vice versa. Further, diagnostic parameters 102, diagnostic reports, and/or service scheduling/information may be transmitted and/or received by standard communication protocols between the diagnostic engine 120 and the controller(s) 104, other component(s) 112, and/or the communication link(s) 114. Moreover, the proprietary controller parameters 102a may be used to develop custom controller diagnostic tests as part of the controller diagnostic process 116. As illustrated in FIG. 2, the unique set of proprietary controller parameters 102 and/or a subset thereof, in conjunction with the other component parameters 102b (e.g., network interface parameters) may be used to develop custom controller diagnostic tests. The diagnostic protocol(s) 116 comprise customized controller, component, and/or plant-specific parameters and tests. Accordingly, the diagnostic protocol(s) 116 are bespoke for particular plants, combinations of the controller(s) 104, and/or combinations of the computing resource(s) 112. In still further examples, the diagnostic parameters 102 may be individually customized. Whereas, in certain examples, the diagnostic parameters 102 are combined in an example customized diagnostic protocol; in other examples, one or more bespoke diagnostic parameters may be created specifically for the evaluation of particular plants, combinations of the controller(s) 104, and/or combinations of the computing resource(s) 112. These bespoke diagnostic parameters may be combined with one or more of the existing diagnostic parameter(s) 102 and/or the diagnostic protocol(s) 116.

The system for plant diagnostics 100 in example embodiments facilitates troubleshooting and service/maintenance of the controller(s) 104. Also in example embodiments, the system 100 conducts an inspection and diagnosis function whereby the diagnostic engine 120 may initiate summary of all of the computing resources/components 112 of the distributed control system/plant network 160 and the plant (or facility) 162. Accordingly, the controller(s) 104 are promoted to query the status and diagnostic condition of all of the component(s) 112 interfaced to the controller(s) 104. A summary or diagnosis, produced at controller level, then provides an overall status and/or diagnosis of the entire plant/facility 162.

As a supplement to the remote diagnosis embodiment(s) described hereinthroughout, diagnostics of and/or by the controller(s) 104 may be carried out by a service engineer by initiating the diagnostic protocol(s) 116 locally using a diagnostic port. Acquired diagnostic parameters 102 may be transmitted for remote expert diagnostics, failure identification, and report generation. Further, remotely initiated diagnostics may be compared to the diagnostic parameter(s) 102 and other outcomes of the diagnostic protocol(s) 116 acquired during a service call by the service engineer. Still further, the diagnostic protocol(s) 116 executed remotely may be different from those executed via local port by a service engineer. Accordingly, comparisons may be made between the diagnostic parameter(s) 104 and/or the diagnostic protocol(s) 116 initiated locally or remotely. As a result, service calls may be more productive and/or return calls may be avoided by offering more information to service engineers before conducting a service call and providing the service engineers with a tool for obtaining expert diagnosis while on site.

In FIG. 2, the controller parameters 102a (e.g., an HN™ controller for managing an I/O bus) are transmitted to the diagnostic engine 120. These controller parameters 102a may include HN800™ (I/O bus) statistics. Statistics may include usage statistics, load statistics, throughput statistics, and/or any other suitable measurements. HN800-specific parameters are an example of the proprietary controller parameters 102a discussed hereinthroughout. These example controller parameters by further acquiring one or more relevant parameters of the component parameters 102b.

In view of the above, the data acquisition can be triggered locally and/or remotely, and then the diagnostic parameters 102 may be collected by remote applications by the controller diagnostic process 116. The controller diagnostic process 116 may generate a diagnostic report for transmission to users, service engineers, and/or other computing resources for performance of service and repair functions and workflow initiations.

Figure 3:
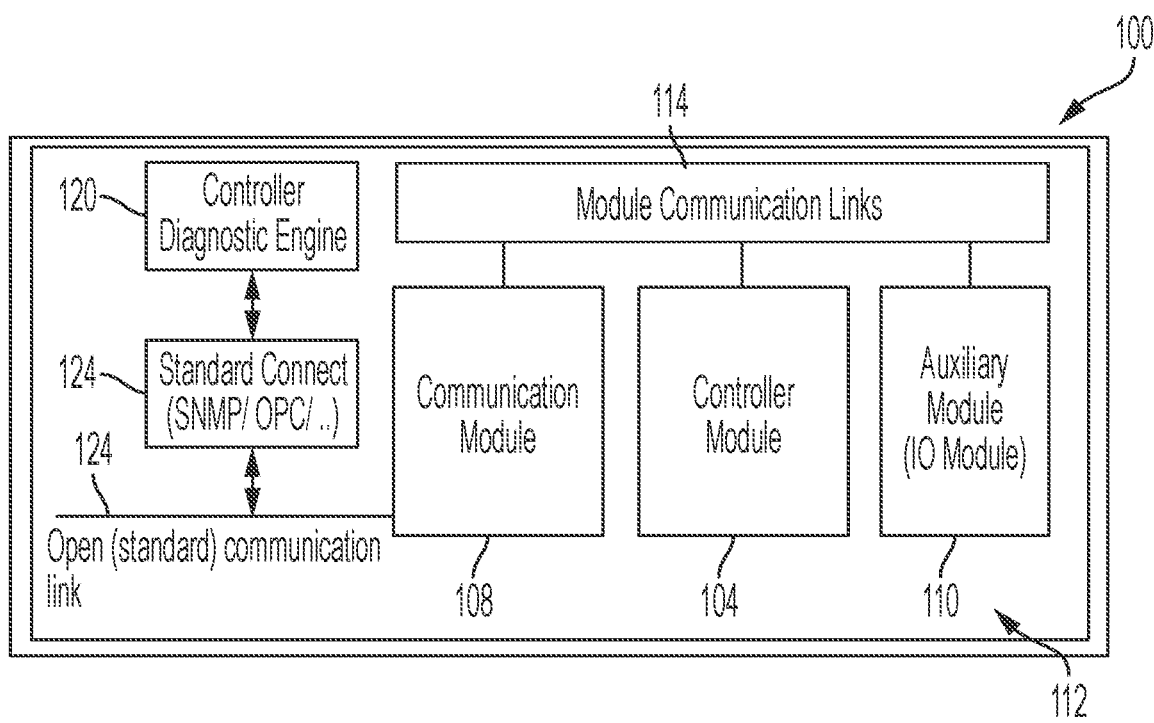
FIG. 3 is a simplified block diagram depicting an example system architecture for the controller and computing resources associated with the system and method for system diagnostics and service.
Figure 4:
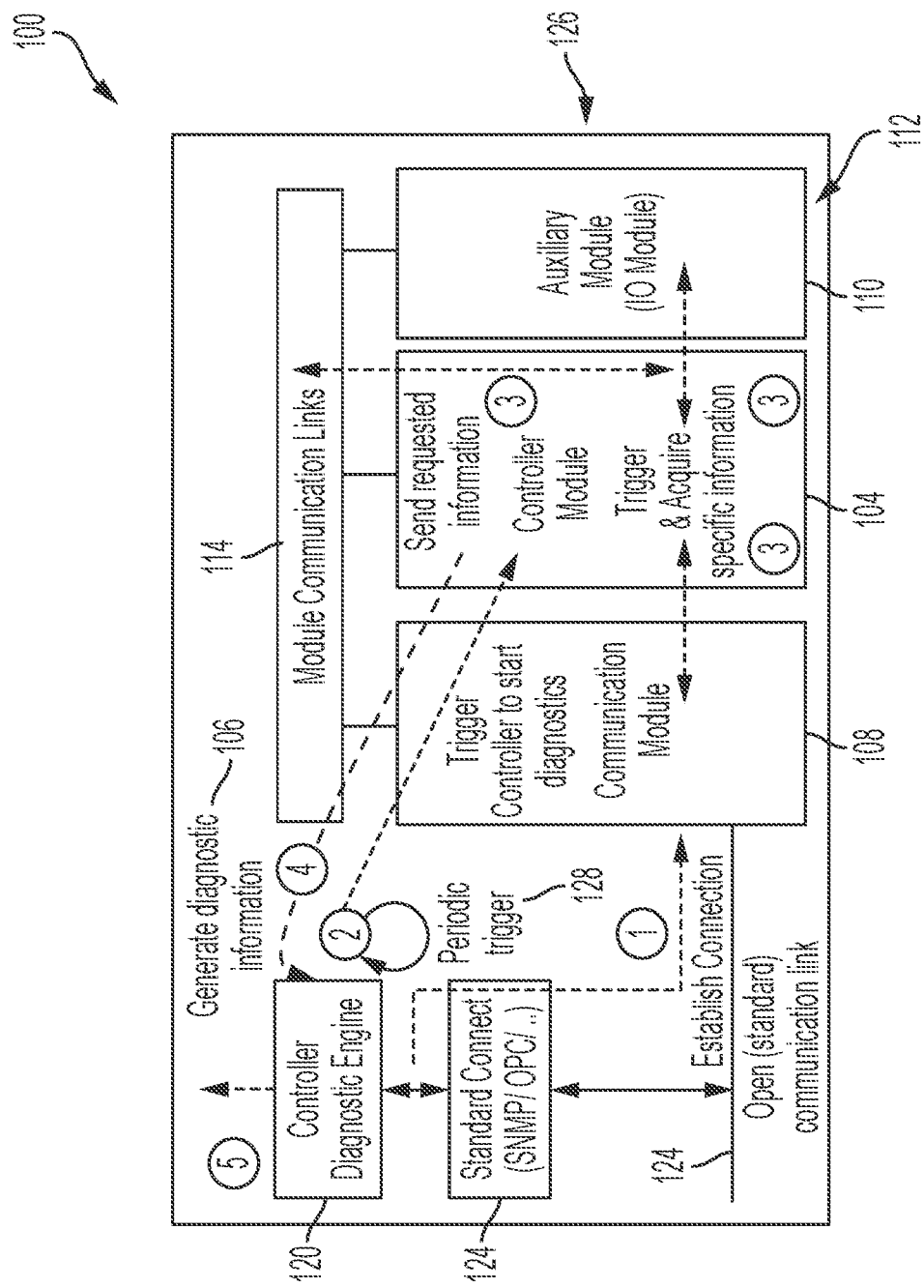
FIG. 4 is a simplified block diagram of an example system architecture depicting an example information collection trigger sequence and flow according to the system and method for controller or plant diagnostics and service.

Referring now to FIGS. 3 and 4, the controller 104 (e.g., HPC/SPC 800™ controllers, Symphony Plus Controller™, and/or other suitable controllers such as those developed by ABB™) generates specific ones of the diagnostic parameters 102 from each of the communication module 108, the controller 104, and the module communication link/bus 114. These component parameters 102b are used in the controller diagnostics engine 120 to generate a diagnosis of the controller 104 and/or one of the computing components 112 interfaced therewith. Diagnosis of the controller 104 may include identification of faults located amongst the communication module 108, the controller 104, and the module communication link/bus 114, and/or the one or more other auxiliary modules 110, such as I/O modules. The component parameter(s) 102b may be specific to modules and/or communication links/busses that are compatible with the controller 104. The module communication link/bus 114 may specifically supply HN800™ proprietary communication parameters. As note hereinabove, the diagnostic parameters 102 may be used to identify faults or inform service decisions regarding the controller 104 and/or others of the associated computing resources 112.

The open communications link 124 may establish communicative connection with runtime support for an example manufacturing plant or facility and/or operations/engineering systems for such a plant or facility. In FIG. 1, the communications link 124 establishes the distributed control network/plant network 160. In an example embodiment, a controller SNMP agent, runtime system SNMP manager, and runtime system for subscribing to controller diagnostic parameters are initialized. Then, the diagnostic engine 120 is configured to read and/or receive the proprietary parameters 102 specific to business logic for the unique plant or facility whereat the controller 104 is installed. Next, a diagnostic log containing diagnostic data, including outcomes of the diagnostic protocols 116 and/or the diagnostic parameter(s) 102 is generated as an output of the system 100. As discussed hereinabove, the proprietary controller parameters 102a may be used to develop custom controller diagnostic tests as part of the controller diagnostic process 116. The unique set of proprietary controller parameters 102a and/or a subset thereof in conjunction with particular ones of the component parameter(s) 102b and/or other external parameters 122 (e.g., network interface parameters plant topology parameters, parameters other than those specific to a controller or computing component, and the like) may be used to develop the custom controller diagnostic tests/protocols. Still further, the proprietary parameters 102, a subset thereof, and/or certain of the external parameters 122 may be leveraged to develop diagnostic logic, methods, custom diagnostic parameters, and/or algorithms specific to topology of a given plant or facility. Therefore, similar to the selective configuration of controllers and controller-related computing resources within custom-built plants and/or manufacturing facilities, the diagnostic tests, methods, logic, and/or algorithms associated therewith may be likewise customized.

Referring now to FIG. 4, a sequence of connectivity 126 is illustrated. Communication links and information generation/gathering may be triggered from the various parts of the system 100 according to a selected timing to establish an operational sequence. At step 1, communicative links are established. Then, at step 2, a periodic and/or demand-based diagnostic trigger 128 is timed and released to initiate the generation and collection of the proprietary parameters 102. At step 3, the specific information of the parameters 102 is measured and detected. Step 4 indicates the transmission of the proprietary parameters 102 to the diagnostic engine 120. The diagnostic engine 120 performs the controller diagnostic process 116 and generates the diagnostic data 106 for transmission to a remote resource, such as the remote support platform 140 (see FIG. 7), at step 5 for interpretation and service decision-making or for automatic service of the controller(s) 104 as a result of the diagnostic data 106.

Figure 5:
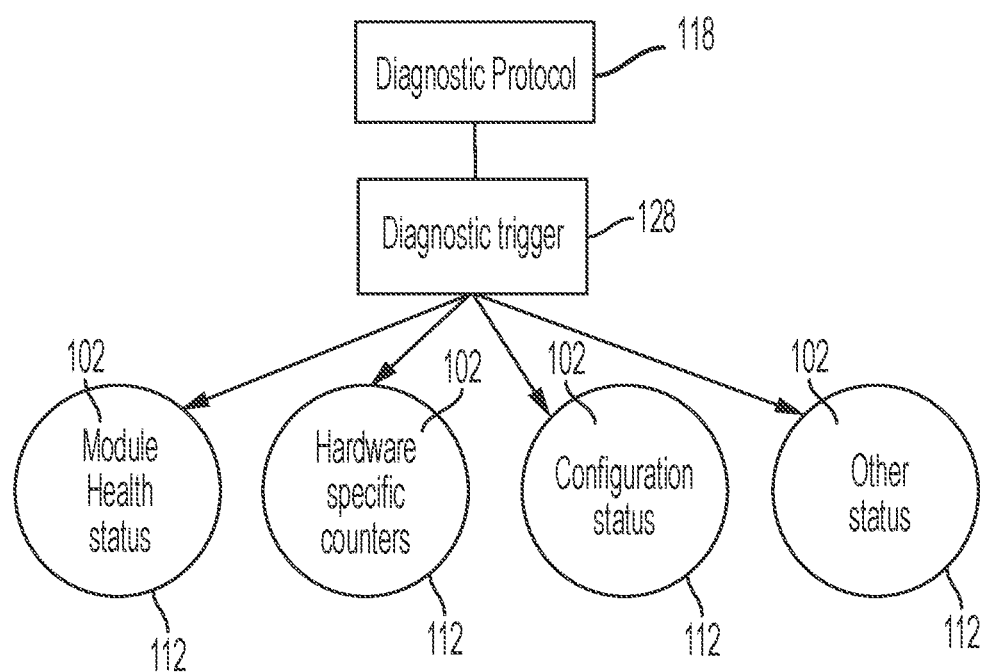
FIG. 5 is a simplified diagram illustrating diagnostic information available to the system and method for system diagnostics and service.

Referring now to FIG. 5, the periodic and/or demand-based diagnostic trigger 128 is communicated to the various computing resources 112 to initiate generation and collection of the proprietary controller, computing component, and external parameters 102a, 102b, 122. The diagnostic process 116 is not limited to proprietary controllers (such as ABB's HPC controller and/or Symphony controllers), but, also, may be used for diagnostics of other modules, such as I/O modules, gateways, FCIs (field connect interfaces), other families of controllers, etc. The diagnostic system and process 100 may use only proprietary parameters and/or may utilize a combination of proprietary parameters with other parameters such as, for example, network interface parameters.

Diagnostic information can be triggered in any combinations given in this list (classified as below). See FIG. 8 for diagnostic parameters and/or diagnostic protocols.

Figure 6:
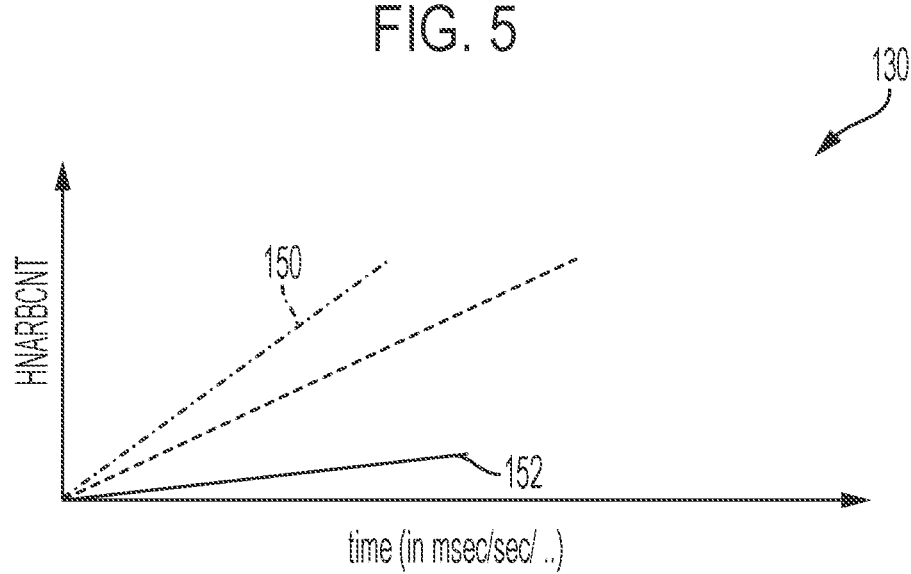
FIG. 6 illustrates an example use for an exemplary one of the proprietary controller diagnostic parameters.

FIG. 6 illustrates an example custom diagnostic test 130 developed from a select one of the proprietary parameters 102, specifically "HNARBCNT" (FIG. 8 lists additional examples of the proprietary parameters 102). The following computing process expresses the diagnostic logic underlying the diagnostic test 130 of FIG. 6.

```
Error Count Slope (Sc) = (HNARBCNT/time)
Diagnostic equation:
If (Sc > 1) then
{
    Redundant module error = true;
    else
    Redundant module error = false;
}
```

An upper solid line of FIG. 6, depicts a redundant module error state 150, while a lower solid line depicts a redundant module healthy state 152. The slope of the specific proprietary parameter, over time, in FIG. 6, is a customized diagnostic test for that proprietary parameter.

Figure 7:
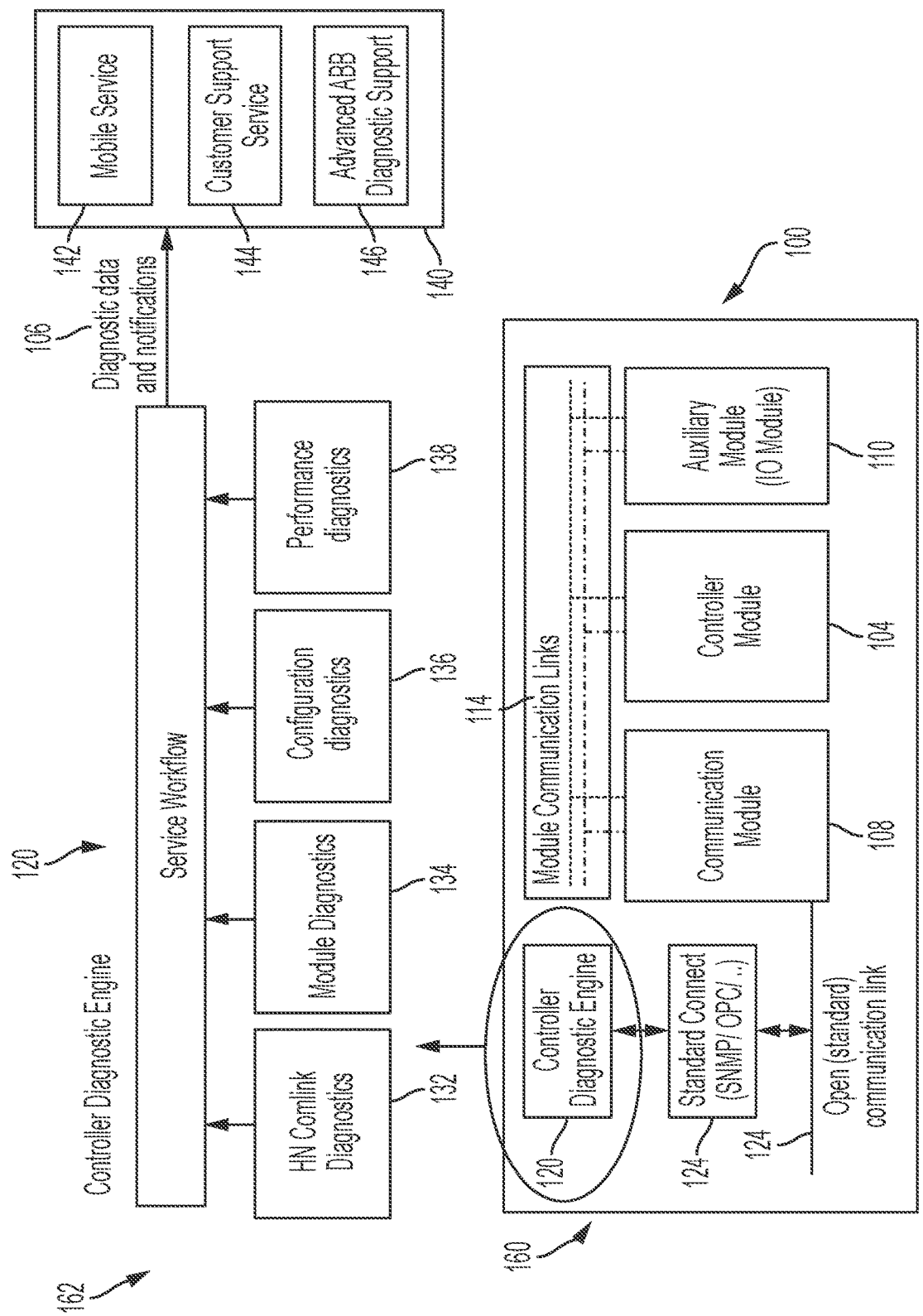
FIG. 7 is a simplified block diagram of an example system architecture depicting a diagnostic engine of the system and method for system diagnostics and service.

FIG. 7 depicts, in greater detail, an example of the diagnostic engine 120. The diagnostic engine 120 may comprise module communication link/bus diagnostics 132, module diagnostics 134 (for each of the associated computing resources 112), configuration diagnostics 136 applicable to the broader controller and system, and/or performance diagnostics 138. The diagnostic data 106 developed by each of these diagnostic engine sub-components may be transmitted to the remote support platform 140. The remote support platform 140 may include a mobile service platform 142, customer support platform 144, and/or advanced diagnostic support platform 146 such as might be provided by a manufacturer and servicer of the controller 104. The remote support platform 140 also may include one or more user interfaces for directing the diagnostic engine 120 and performing other service or diagnostics-related operations. In example embodiments, the diagnostic engine 120 may be located remotely and may be housed within and/or on the mobile service platform 142, the customer support platform 144, the advanced diagnostic support platform 146, and/or any other suitable standalone platform. Still further, in example embodiments, controller service orders and workflow initiation may be prompted by any one of the various platforms of the remote support platform 140. Continuous monitoring of the triggered parameter values may be desired and/or or demand-based access to the controller diagnostic information/data 106 or the proprietary parameters 102. For example, a finger print application of a plant or manufacturing facility may be continuously monitored for triggering events.

The embodiment(s) detailed hereinabove may be combined in full or in part, with any alternative embodiment(s) described.

INDUSTRIAL APPLICABILITY

According to the present disclosure, custom diagnostic logic may be developed from proprietary parameters generated by specific and/or custom-built controllers and control systems.

The disclosed systems and methods can be implemented with a computer system using, for example, software, hardware, or a combination of both, either in a dedicated server, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processors. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus(es) for storing information and instructions to be executed by processor(s).

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. One or more processors in a multi-processing arrangement may also be employed to execute the sequences of instructions contained in memory. In alternative implementations, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A distributed control system for an industrial plant, the distributed control system comprising:
    a diagnostic engine;
    a plurality of computing resources configured to generate diagnostic parameters for transmission to the diagnostic engine, wherein the plurality of computing resources comprises a plurality of controllers configured to manage an operation of the industrial plant and a plurality of communication modules;

a first communication link operatively coupling the plurality of computing resources to one another via the plurality of communication modules;

a second communication link operatively coupling the plurality of computing resources to the diagnostic engine; and a remote connection operatively coupling the diagnostic engine to a remote computing resource, wherein at least one of the plurality of controllers is configured to generate the diagnostic parameters that identify communication faults between one or more of the plurality of controllers and one or more of the plurality of communication modules and/or between the one or more of the plurality of communication modules and the first communication link, wherein the diagnostic engine is configured to locally observe the diagnostic parameters of the plurality of computing resources via the second communication link, wherein the remote computing resource is configured to initiate an operation of the diagnostic engine via the remote connection and further configured to evaluate the diagnostic parameters remotely, and wherein the operation of the diagnostic engine is configured to implement a diagnostic protocol, wherein the diagnostic protocol is configured to:

identify, based on the diagnostic parameters, the communication faults between the one or more of the plurality of controllers and the one or more of the plurality of communication modules and/or between the one or more of the plurality of communication modules and the first communication link; and transmit, in response to identifying the communication faults, the diagnostic parameters to at least one of the plurality of computing resources to implement one or more operations that (i) re-route functions in the industrial plant, (ii) shut down functions in the industrial plant, (iii) shut down one or more subnets of the first and second communication links, and/or (iv) shut down the industrial plant.

2. The distributed control system of claim 1, wherein the plurality of computing resources comprises a plurality of other computing components.

3. The distributed control system of claim 2, wherein the plurality of other computing components in combination with the plurality of controllers are configured to manage the operation of the industrial plant, and wherein the remote computing resource is configured to develop diagnostic logic that is configured to determine operating conditions of the industrial plant.

4. The distributed control system of claim 3, wherein the remote computing resource is further configured to develop the diagnostic logic based on at least some of the diagnostic parameters.

5. The distributed control system of claim 3, wherein the remote computing resource is further configured to customize the diagnostic logic for the plurality of controllers and the plurality of other computing components.

6. The distributed control system of claim 2, wherein the plurality of other computing components comprises one or more auxiliary modules.

7. The distributed control system of claim 2, wherein the diagnostic parameters comprise one or more controller parameters.

8. The distributed control system of claim 7, wherein the diagnostic parameters further comprise one or more other computing component parameters.

9. The distributed control system of claim 1, wherein the second communication link is configured to transmit diagnostic logic, diagnostic data, and/or service data utilizing an open standard communication protocol.

10. A remotely diagnosable distributed control system for an industrial plant, the remotely diagnosable distributed control system comprising:

a network of distributed controllers configured to manage an operation of the industrial plant;

a plurality of communication modules;

a first communication link operatively coupling the network of distributed controllers to one another via the plurality of communication modules;

a second communication link;

a diagnostic engine communicatively coupled to the network of distributed controllers via the second communication link and configured to monitor a plurality of diagnostic parameters; and a remote communication link configured to allow remote access to the diagnostic engine from a remote support platform, such that the remote support platform can obtain the plurality of diagnostic parameters and can initiate support services, wherein at least one of network of distributed controllers is configured to generate the diagnostic parameters that identify communication faults between one or more of the network of distributed controllers and one or more of the plurality of communication modules and/or between the one or more of the plurality of communication modules and the first communication link, wherein the diagnostic engine, in response to the remote support platform initiating the support services, is further configured to:

identify, based on the diagnostic parameters, the communication faults between the one or more of the network of distributed controllers and the one or more of the plurality of communication modules and/or between the one or more of the plurality of the communication modules and the first communication link; and transmit, in response to identifying the communication faults, the diagnostic parameters to at least one of the network of distributed controllers to implement one or more operations that (i) re-route functions in the industrial plant, (ii) shut down functions in the industrial plant, (iii) shut down one or more subnets of a network of the industrial plant, and/or (iv) shut down the industrial plant.

11. The remotely diagnosable distributed control system of claim 10, wherein the support services comprise a diagnostic protocol, a hardware service order, a software service order, and/or a diagnostic data collection.

12. The remotely diagnosable distributed control system of claim 10, wherein the remote support platform comprises a plurality of remote computing resources.

13. The remotely diagnosable distributed control system of claim 12, wherein the plurality of remote computing resources comprises a mobile device, an enterprise platform, and a support provider.

14. The remotely diagnosable distributed control system of claim 10, wherein the remote support platform directs the diagnostic engine to execute a diagnostic protocol, and wherein the diagnostic protocol is customizable based on a configuration associated with the network of distributed controllers.

15. The remotely diagnosable distributed control system of claim 14, wherein the diagnostic protocol is configured to direct the diagnostic engine to generate one or more controller parameters from the network of distributed controllers.

16. The remotely diagnosable distributed control system of claim 14, wherein the diagnostic protocol is configured to direct the diagnostic engine to observe a parameter from a computing component communicatively coupled to at least one controller of the network of distributed controllers.

17. A method of remotely diagnosing a system of an industrial plant, the method comprising:
  remotely accessing a diagnostic engine via a remote support platform, wherein the diagnostic engine is coupled to a plurality of computing resources of the industrial plant via one or more communication links, wherein the plurality of computing resources comprises a plurality of controllers configured to manage an operation of the industrial plant and a plurality of communication modules, and wherein the plurality of controllers is communicatively coupled to one another via the plurality of communication modules utilizing the one or more communication links;
  generating, by at least one of the plurality of controllers, a plurality of diagnostic parameters comprising at least one controller parameter and at least one component parameter that identify communication faults between one or more of the plurality of controllers and one or more of the plurality of communication modules and/or between the one or more of the plurality of communication modules and the first communication link;
  developing at least one diagnostic protocol based on the plurality of diagnostic parameters;
  triggering the diagnostic engine to execute the at least one diagnostic protocol;
  identifying, by the at least one diagnostic protocol and based on the plurality of diagnostic parameters, the communication faults between the one or more of the plurality of controllers and the one or more of the plurality of communication modules and/or between the one or more of the plurality of communication modules and the one or more communication links; and
  transmitting, by the at least one diagnostic protocol in response to identifying the communication faults, the diagnostic parameters to at least one of the plurality of computing resources to implement one or more operations that (i) re-route functions in the industrial plant, (ii) shut down functions in the industrial plant, (iii) shut down one or more subnets of the one or more communication links, and (iv) shut down the industrial plant.

18. The method of claim 17, further comprising receiving the plurality of diagnostic parameters from the diagnostic engine.

19. The method of claim 17, wherein the diagnostic protocol is one of module diagnostics, performance diagnostics, and configuration diagnostics.

20. The method of claim 17, further comprising remotely initiating a service based on the diagnostic protocol and a customer specification received via the remote support platform.

* * * * *